United States Patent
Boettcher et al.

(10) Patent No.: US 11,135,903 B2
(45) Date of Patent: Oct. 5, 2021

(54) METHOD OF ASSEMBLING A COMPOSITE SIDE CABIN STRUCTURE WITH INTEGRATED STRUCTURAL CORE FOR A VEHICLE

(71) Applicant: Honda Motor Co., Ltd., Tokyo (JP)

(72) Inventors: Eric J. Boettcher, Columbus, OH (US); Irene A. Cifra, Columbus, OH (US)

(73) Assignee: HONDA MOTOR CO., LTD., Tokyo (JP)

(*) Notice: Subject to any disclaimer, the term of this patent is extended or adjusted under 35 U.S.C. 154(b) by 179 days.

(21) Appl. No.: 16/655,877

(22) Filed: Oct. 17, 2019

(65) Prior Publication Data
US 2021/0114443 A1 Apr. 22, 2021

(51) Int. Cl.
B62D 25/02 (2006.01)
B62D 25/04 (2006.01)
B60J 5/04 (2006.01)
B62D 29/04 (2006.01)

(52) U.S. Cl.
CPC .......... B60J 5/0463 (2013.01); B60J 5/0416 (2013.01); B60J 5/0484 (2013.01); B62D 25/02 (2013.01); B62D 25/04 (2013.01); B62D 29/043 (2013.01)

(58) Field of Classification Search
CPC ...... B62D 65/02; B62D 65/024; B62D 65/06; B62D 25/02; B62D 25/025; B62D 25/04
See application file for complete search history.

(56) References Cited

U.S. PATENT DOCUMENTS

| 2,793,971 | A | | 5/1957 | Collins et al. |
| 4,705,716 | A | | 11/1987 | Tang |
| 5,002,309 | A | * | 3/1991 | Vecellio .................... B05C 7/04 180/312 |
| 6,296,301 | B1 | | 10/2001 | Schroeder et al. |
| 8,991,900 | B2 | | 3/2015 | Yamaji et al. |
| 9,873,464 | B2 | | 1/2018 | Schnaufer et al. |

(Continued)

FOREIGN PATENT DOCUMENTS

DE 8706593 8/1987
EP 0670257 9/1995
(Continued)

Primary Examiner — Gregory A Blankenship
(74) Attorney, Agent, or Firm — Rankin Hill & Clark LLP

(57) ABSTRACT

A method of assembling at least two types of vehicles with different powertrain requirements on the same assembly line is provided. The method includes assembling a first structural body component for a first vehicle type including a first powertrain requirement. The first structural body component comprises a first structural core surrounded by a first fiber reinforced material having a first thickness. The first structural body component has a first external geometry. The method includes assembling a second structural body component for a second vehicle type that has a second powertrain requirement different from the first powertrain requirement. The second structural body component comprises a second structural core surrounded by a second fiber reinforced material having a second thickness different from the first thickness. The second structural body component has a second external geometry that is the same in shape and dimension as the first external geometry.

20 Claims, 6 Drawing Sheets

(56) References Cited

U.S. PATENT DOCUMENTS

| | | | |
|---|---|---|---|
| 2003/0230443 A1 | 12/2003 | Cramer et al. | |
| 2006/0141260 A1 | 6/2006 | Haque et al. | |
| 2006/0233978 A1* | 10/2006 | Yamazaki | F16F 7/121 428/34.1 |
| 2011/0080020 A1* | 4/2011 | Ilzhoefer | B29C 70/86 296/181.2 |
| 2013/0313862 A1* | 11/2013 | Yamaji | B62D 25/2036 296/203.01 |
| 2013/0334839 A1* | 12/2013 | Grevener | B62D 63/025 296/193.07 |
| 2014/0084635 A1* | 3/2014 | Matsuda | B62D 25/00 296/205 |
| 2016/0129948 A1* | 5/2016 | Schnaufer | B62D 29/043 296/203.01 |
| 2016/0214333 A1 | 7/2016 | Schnaufer et al. | |
| 2018/0229788 A1* | 8/2018 | Erlacher | B62D 25/2009 |
| 2020/0346696 A1* | 11/2020 | Donabedian | B62D 29/001 |
| 2021/0016833 A1* | 1/2021 | Moss | B62D 21/09 |
| 2021/0114443 A1* | 4/2021 | Boettcher | B60J 5/0463 |

FOREIGN PATENT DOCUMENTS

| | | |
|---|---|---|
| EP | 1052164 | 11/2000 |
| GB | 2521937 | 8/2015 |
| WO | 2014195590 | 12/2014 |

\* cited by examiner

METHOD OF ASSEMBLING A COMPOSITE SIDE CABIN STRUCTURE WITH INTEGRATED STRUCTURAL CORE FOR A VEHICLE

BACKGROUND

Known vehicle body construction can comprise a fiber reinforced polymer (FRP) cabin on an aluminum or steel chassis or vehicle frame. The FRP cabin includes a left and right side cabin structures, each of which consists of vertical pillars, a roof side rail and a side sill. The different FRP molded parts for the side cabin structure are typically assembled and bonded together in a layered configuration (i.e., outer panel, reinforcements, inner panel). Multiple fiber formats (i.e., unidirectional, braided, non-crimp fabric, and chopped, randomly oriented fibers) can be applied to a structural foam core for forming the side cabin structure. Resin transfer molding and compression molding processes are generally used to mold the parts of the side cabin structure. Further, current trend towards vehicle electrification generally results in different weight class requirements for the same vehicle type (i.e., vehicle model) with different powertrain requirements (i.e., internal combustion engine (ICE), hybrid battery electric/plug-in hybrid battery electric (HEV/PHEV), and battery electric vehicle (BEV)). For example, it is expected that weight increases for PHEV and BEV powertrain requirements on the same vehicle type may result in each vehicle type being separated by several weight classes. In addition, different body specifications for each powertrain requirement can lead to separate concurrent assembly efforts for each vehicle type and the corresponding investments for the different FRP body structures. Additionally, new options need to be evaluated for weight management in vehicle assembly with the expected weight increases for HEV/PHEV/BEV powertrain requirements.

BRIEF DESCRIPTION

According to one aspect, a method of assembling at least two types of vehicles with different powertrain requirements on the same assembly line is provided. The method comprises assembling a first structural body component for a first vehicle type including a first powertrain requirement on an assembly line. The first structural body component comprises a first structural core surrounded by a first fiber reinforced material having a first thickness. The first structural body component has a first external geometry. The method comprises assembling a second structural body component for a second vehicle type on the same assembly line that has a second powertrain requirement different from the first powertrain requirement. The second structural body component comprises a second structural core surrounded by a second fiber reinforced material having a second thickness that is different than the first thickness of the first fiber reinforced material of the first structural body component. The second structural body component has a second external geometry. The first external geometry is the same in shape and dimension as the second external geometry.

According to another aspect, a method of assembling at least two types of vehicles with different powertrain requirements on the same assembly line is provided. The method comprises encasing a first structural core with a first fiber reinforced material having a first thickness to form a first structural side cabin structure for a first vehicle type being assembled on an assembly line, the first vehicle type includes a first powertrain requirement; and encasing a second structural core with a second fiber reinforced material having a second thickness differing from the first thickness to form a second structural side cabin structure for a second vehicle type being assembled on the same assembly line, the second vehicle type includes a second powertrain requirement different from the first powertrain requirement. The second structural core has a cross-section perimeter differing in dimension from a cross-section perimeter of the first structural core so that a first external geometry of the first structural side cabin structure is the same in shape and dimension as a second external geometry of the second structural side cabin structure.

According to another aspect, a method of assembling at least three types of vehicles with different powertrain requirements on the same assembly line is provided. The method comprises assembling a first structural body component for a first vehicle type including a first powertrain requirement on an assembly line. The first structural body component comprises a first structural core surrounded by a first fiber reinforced material having a first thickness. The method comprises assembling a second structural body component for a second vehicle type on the same assembly line that has a second powertrain requirement different from the first powertrain requirement. The second structural body component comprises a second structural core surrounded by a second fiber reinforced material having a second thickness that is different than the first thickness of the first fiber reinforced material of the first structural body component. The method comprises assembling a third structural body component for a third vehicle type on the same assembly line that has a third powertrain requirement different from the first and second powertrain requirements. The third structural body component comprises a third structural core surrounded by a third fiber reinforced material having a third thickness that is different than the first and second thicknesses of the respective first and second fiber reinforced materials of the first and second structural body components. The first structural body component is part of a side cabin structure for the first vehicle type and has a first external geometry. The second structural body component is part of a side cabin structure for the second vehicle type and has a second external geometry. The third structural body component is part of a side cabin structure for the third vehicle type and has a third external geometry. The first external geometry, the second external geometry and the third external geometry are of the same cross-sectional shape and same dimension.

DETAILED DESCRIPTION

Figure 1:
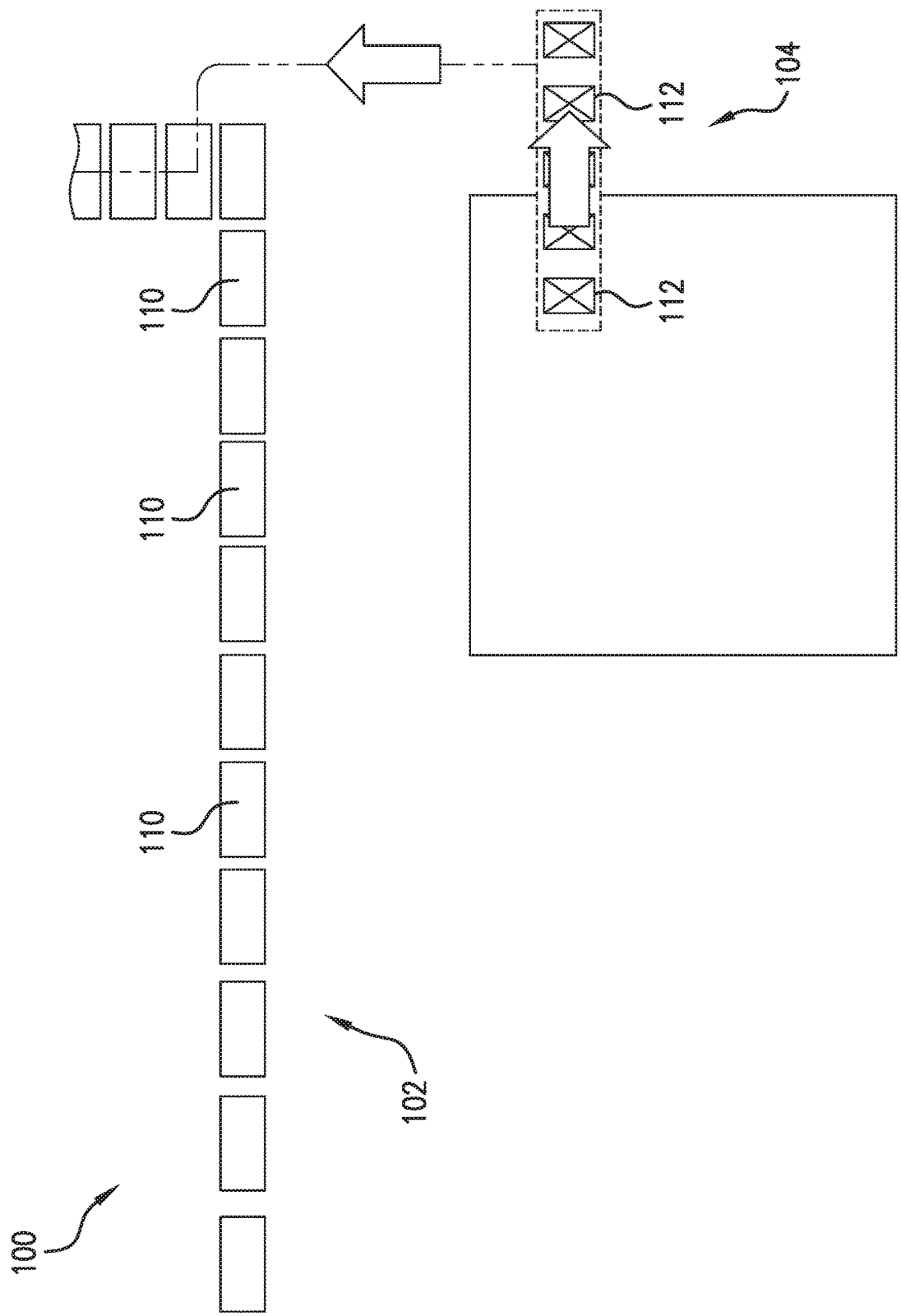
FIG. 1 is a schematic view of an assembly line for assembling a vehicle body.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 schematically illustrates a vehicle assembly line 100 for assembling at least two types of vehicles with different powertrain requirements, according to the present disclosure. According to one aspect of the present disclosure, the powertrain requirements for the differing vehicle types to be assembled on the assembly line 100 are selected from internal combustion engine (ICE), plug-in hybrid electric (PHEV), hybrid electric (HEV), and battery electric (BEV). However, it should be appreciated that the powertrain requirements for the differing vehicle types can also be selected from fuel cell (FCV), fuel cell electric (FCEV), and natural gas (NGV). Therefore, the term "vehicle type" is used simply to distinguish between vehicles of, for example, the same model but with different powertrain requirements.

The assembly line 100 can consist of a first assembly line 102 and a second assembly line 104. The first assembly line 102 has a plurality of first stations 110 for welding first structural components that define a chassis or vehicle frame common to each of the vehicle types. Depending on the vehicle type, the vehicle frame can comprise a front frame assembly, a center floor frame assembly and a rear frame assembly. The second assembly line 104 has a plurality of second stations 112 for forming at least one exemplary structural body component to be secured to the vehicle frame. In the present aspect, the at least one structural component is part of both a left structural side cabin structure and a right structural side cabin structure that are common in proportion for each vehicle type.

Figure 2:
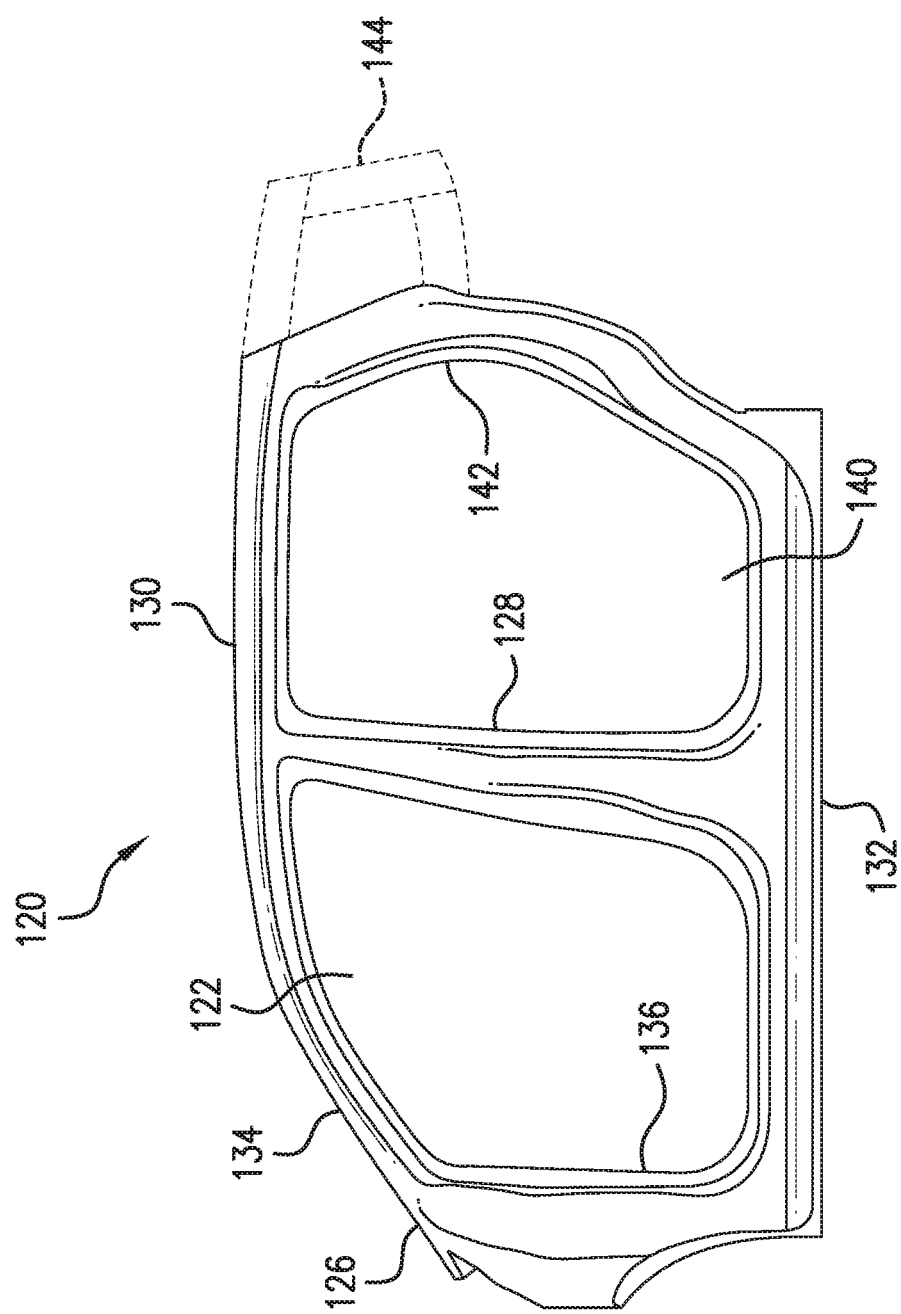
FIG. 2 is a side view of a side cabin structure to be assembled on the assembly line of FIG. 1.
Figure 3:
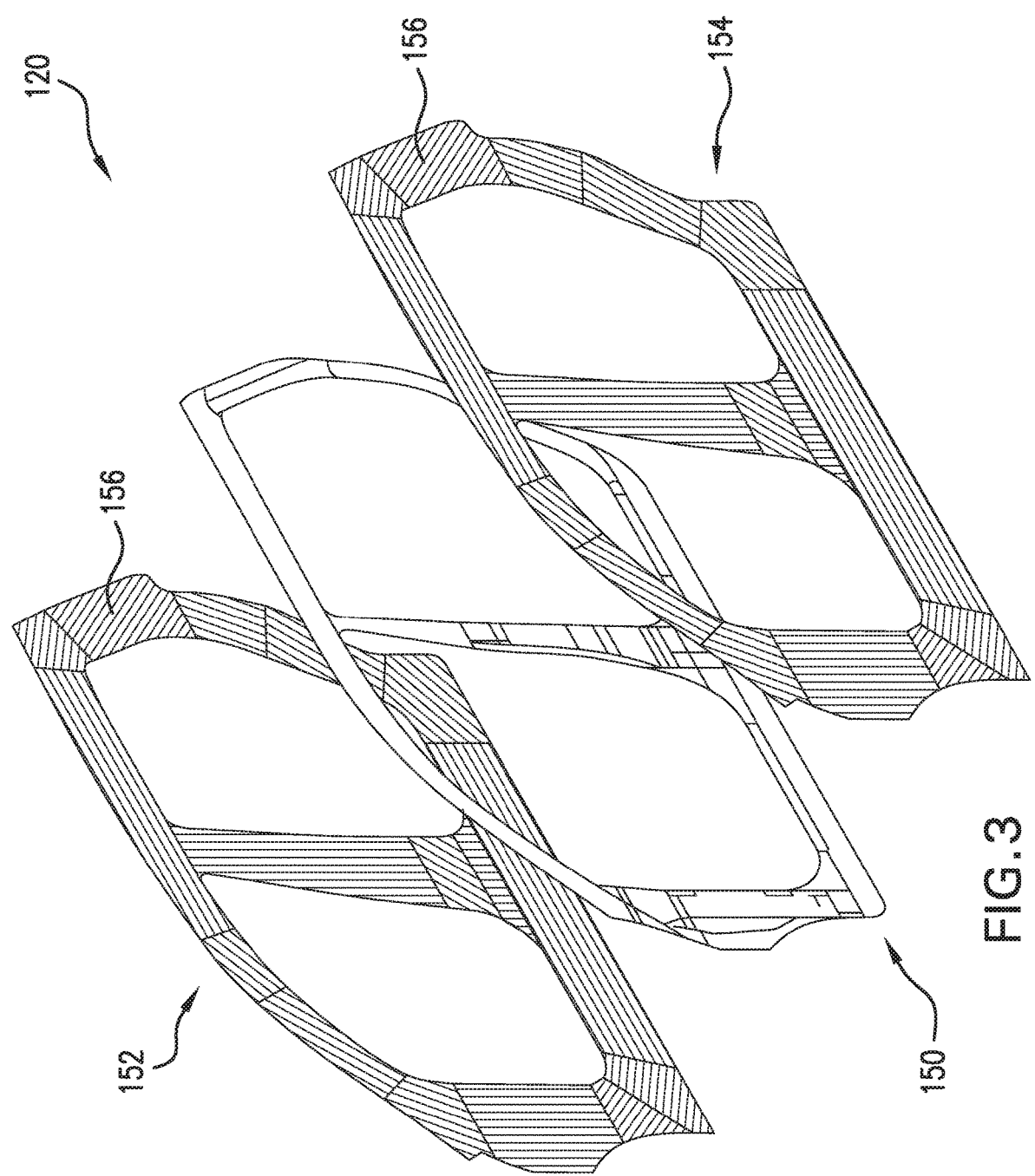
FIG. 3 is an exploded perspective view of the side cabin structure of FIG. 2.

FIGS. 2 and 3 depict a left side cabin structure 120 to be formed in the second assembly line 104 according to the present disclosure. The side cabin structure 120 defines a first door opening 122 (i.e., the front opening to which a front door is attached) and includes a first structural pillar 126 (i.e., the A-pillar) and a second structural pillar 128 (i.e., the B-pillar) rearward of the first structural pillar 126. The side cabin structure 120 comprises a roof side rail 130 forming an upper part thereof and a side sill 132 forming a lower part thereof which are interconnected by the first and second structural pillars 126, 128 so as to jointly form the side cabin structure 120. As shown, the first structural pillar 126 can include a front pillar upper 134 and a front pillar lower 136. The side cabin structure 120 can further comprise second door opening 140 (i.e., the rear opening to which a rear door is attached) partitioned from the first door opening by the second structural pillar 128 and a third structural pillar 142 (i.e., the C-pillar) rearward of the second structural pillar and also interconnecting the roof side rail 130 and the side sill 132. It should be appreciated that depending on the vehicle type being assembled on the assembly line 100, the side cabin structure 120 can further comprise a fourth structural pillar 144 (i.e., the D-pillar shown in hidden lines in FIG. 2) rearward of the third structural pillar 142. It should be appreciated that the left and right side cabin structures may be identically constructed, but for their disposition on opposite sides of the vehicle frame.

As indicated above, the at least one structural component is part the side cabin structure 120. Accordingly, dependent on the specific powertrain requirement (e.g., internal combustion engine (ICE), hybrid battery electric/plug-in hybrid battery electric (HEV/PHEV), and battery electric vehicle (BEV)) for the vehicle type being assembled on the assembly line 100, the at least one structural component can define at least one of the structural pillars, the roof side rail and the side sill of the side cabin structure 120. In FIG. 3, the at least one structural body component is the entirety of the side cabin structure 120. Therefore, according to the present disclosure, the side cabin structure 120 comprises a structural core 150, an inner composite covering 152 and an outer composite covering 154. The structural core 150 can be formed of a lightweight foam material; although, alternative materials for the structural core are contemplated. The inner and outer composite coverings 152, 154 surround or encase the structural core 150 and are formed from a material 156 having glass, carbon, or other high strength reinforcing fibers.

Figure 6A:
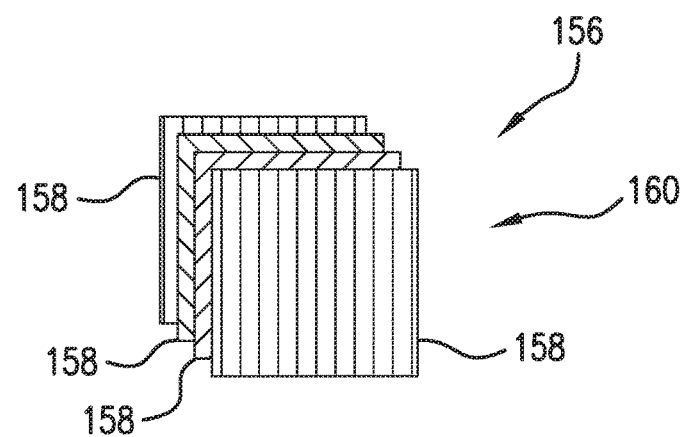
FIGS. 6A and 6B schematically depict layering of fiber reinforced materials for forming the structural body component for each vehicle type being assembled on the assembly line of FIG. 1.
Figure 6B:
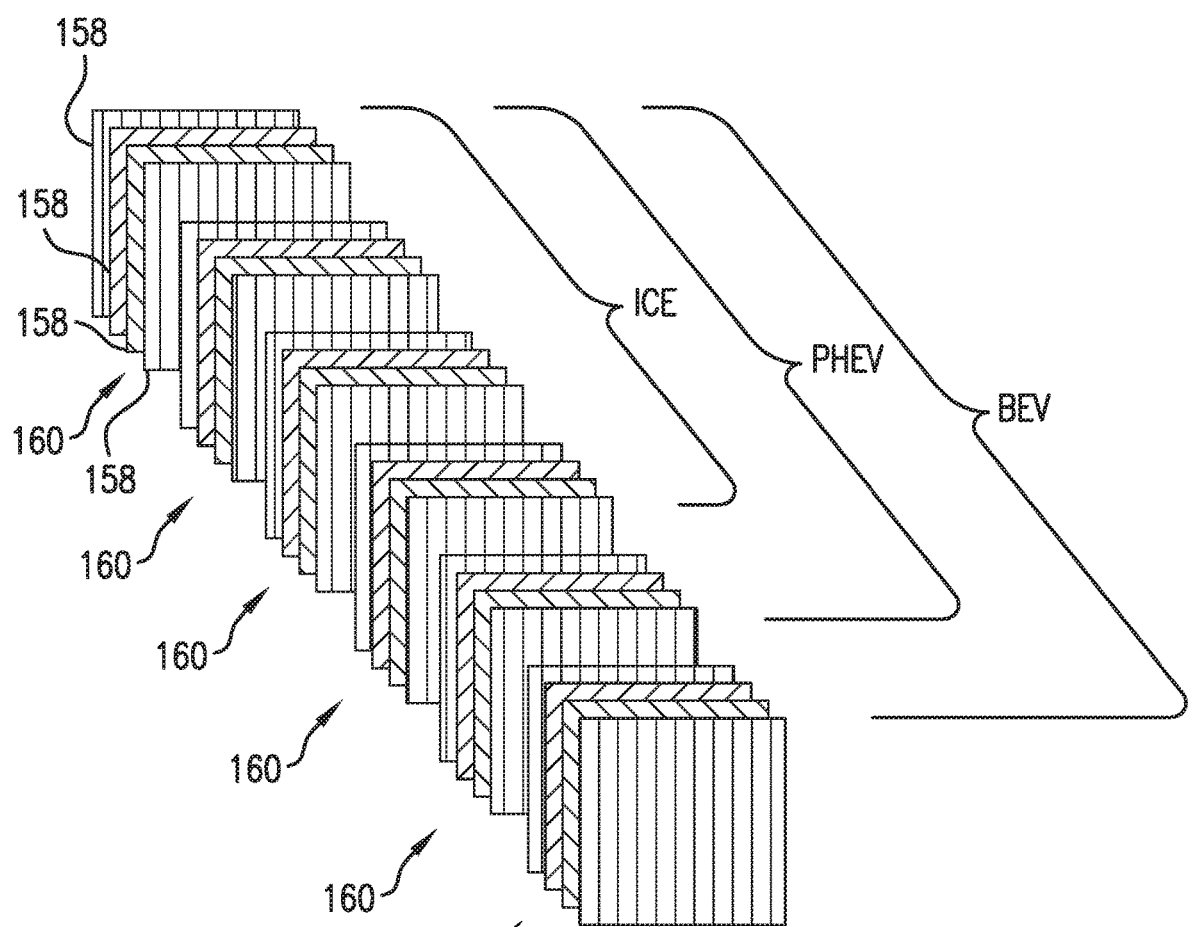

In FIG. 6A, the surrounding fiber reinforced material 156 can consist of a predetermined number of fiber reinforced plies 158 adhered together to define at least one layer 160 of fiber reinforced material 156 tailored to meet vehicle body specification requirements. In the depicted embodiment, and by way of example only, the layer 160 can consist of about four plies 158; however, it should be appreciated that how a "ply" and a "layer" are each defined can depend of fiber format and fiber deposition process. Further, a variety of different plies having differing fiber patterns arranged in differing orders can be used for each layer. As discussed previously, vehicle electrification generally results in different weight class requirements for the same vehicle type with different powertrain requirements (e.g., internal combustion engine (ICE), hybrid battery electric/plug-in hybrid battery electric (HEV/PHEV), and battery electric vehicle (BEV)). With the increase in weight associated with the hybrid battery electric/plug-in hybrid battery electric (HEV/PHEV), and battery electric vehicle (BEV) powertrain requirements, corresponding design considerations are provided for the inner and outer composite coverings 152, 154 to allow for the side cabin structure 120 to be common in proportion for each vehicle type. By way of example only, FIG. 6B depicts that for the internal combustion engine (ICE) powertrain requirement, a predetermined number of layers 160 (n) consisting of a predetermined number of plies 158 (y) of fiber reinforced material 156 (e.g., about four layers 160 consisting of about sixteen plies 158) are provided for the inner and outer composite coverings 152, 154. For the plug-in hybrid battery electric (PHEV) powertrain requirement, a predetermined number of layers 160 (n+a) consisting of a predetermined number of plies 158 (y+b) of fiber reinforced material 156 (e.g., about five layers 160 consisting of about twenty plies 158) are provided for the inner and outer composite coverings 152, 154. And for the battery electric vehicle (BEV) powertrain requirement, a predetermined number of layers 160 (n+$a_1$) consisting of a predetermined number of plies 158 (y+$b_1$) of fiber reinforced material 156 (e.g., about six layers 160 consisting of about twenty-four plies 158) are provided for the inner and outer composite coverings 152, 154.

Figure 4C:
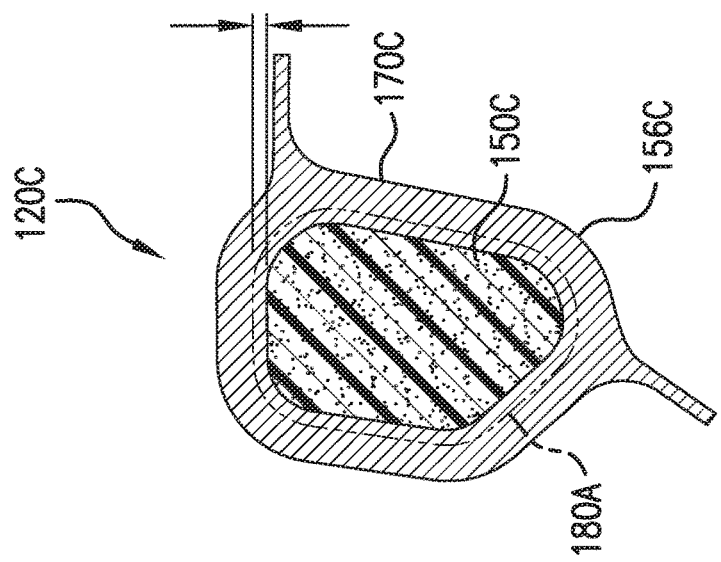
FIGS. 4A, 4B, and 4C are cross-sectional views of a structural body component of the side cabin structure of FIG. 2, a cross-sectional configuration of the structural body component dependent on a powertrain requirement for a type of vehicle being assembled on the assembly line of FIG. 1.
Figure 4B:
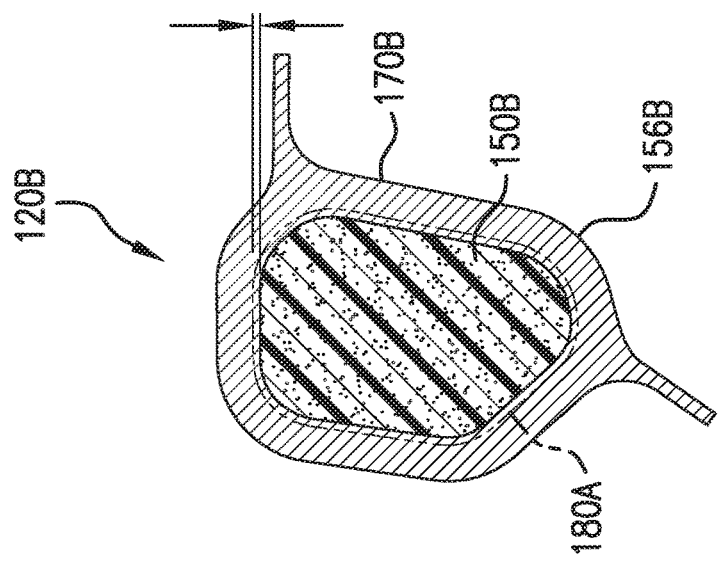
Figure 4A:
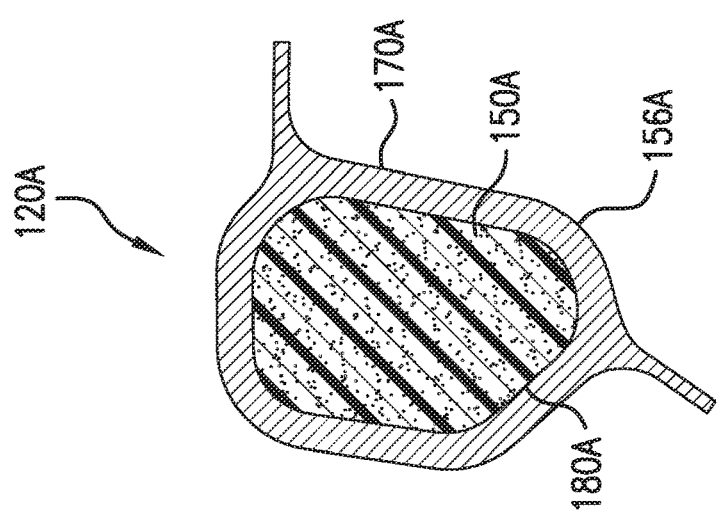

Therefore, according to the present disclosure, assembled on the same assembly line 100 are a first structural body component (e.g., a first side cabin structure 120A) for a first vehicle type including a first powertrain requirement (e.g., the internal combustion engine (ICE)), a second structural body component (e.g., a second side cabin structure 120B) for a second vehicle type including a second powertrain requirement (e.g., the hybrid battery electric/plug-in hybrid battery electric (HEV/PHEV)), and a third structural body component (e.g., a third side cabin structure 120C) for a third vehicle type including a third powertrain requirement (e.g., the battery electric vehicle (BEV)). FIGS. 4A, 4B, and 4C are cross-sectional views of the respective first, second and third side cabin structures. In FIG. 4A, the first side cabin structure 120A comprises a first structural core 150A surrounded by a first fiber reinforced material 156A having a first thickness. The first side cabin structure 120A has a first external geometry that defines a first cross-section perimeter 170A. It should be appreciated that the cross-sectional profile of the first side cabin structure 120A can have any arbitrary cross-sectional shape that is extended in a longitudinal direction of the profile. In FIG. 4B, the second side cabin structure 120B comprises a second structural core 150B surrounded by a second fiber reinforced material 156B having a second thickness. The second side cabin structure 120B has a second external geometry that defines a second cross-section perimeter 170B. In FIG. 4C, the third side cabin structure 120C comprises a third structural core 150C surrounded by a third fiber reinforced material 156C having a third thickness. The third side cabin structure 120C has a third external geometry that defines a third cross-section perimeter 170C.

To allow for the selective use of the first, second and third side cabin structures 120A, 120B, 120C with the common vehicle frame being assembled on the assembly line 100 for the differing vehicle types, the first, second and third external geometries of the first, second and third side cabin structures are of the same shape and dimension (i.e., the first, second and third cross-section perimeters 170A, 170B, 170C are identical). However, to account for the increase in weight associated with the differing powertrain requirements, the thickness of the fiber reinforced material 156 differs. Specifically, depicted in FIGS. 4A, 4B, and 4C, the first thickness of the first fiber reinforced material 156A of the first body component 120A (for use, e.g., with the ICE powertrain requirement) is less than each of the second thickness of the second fiber reinforced material 156B of the second body component 120B and the third thickness of the third fiber reinforced material 156C of the third body component 120C. And the second thickness of the second fiber reinforced material 156B of the second body component 120B (for use, e.g., with the HEV/PHEV powertrain requirement) is less than the third thickness of the third fiber reinforced material 156C of the third body component 120C (for use, e.g., with the BEV powertrain requirement).

To allow for the differing thickness of the fiber reinforced material 156 while maintaining the same external geometries of the first, second and third side cabin structures 120A, 120B, 120C, the first, second and third structural cores 150A, 150B, 150C have differing core external geometries (i.e., the same cross-sectional shape but differing dimensions). As shown, the first structural core 150A has a first core external geometry 180A. The second structural core 150B has a second core external geometry 180B dimensioned smaller than the first core external geometry (note the change in thickness shown in FIG. 4B). The third structural core 150C has a third core external geometry 180C dimensioned smaller than both the first core external geometry (note the change in thickness shown in FIG. 4C) and the second core external geometry. Further depicted in FIGS. 4B and 4C, additional second fiber reinforced material for the second structural body component 120B is offset inwardly toward a center of the second structural core 150B, and additional third fiber reinforced material for the third structural body component 120C is offset inwardly toward a center of the third structural core 150C.

Figure 5A:
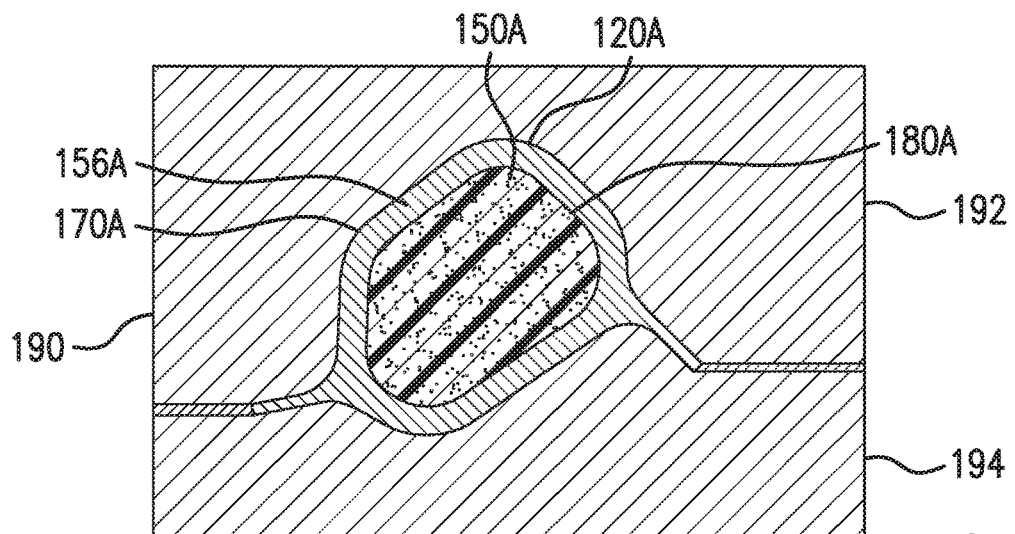
FIGS. 5A, 5B, and 5C are cross-sectional schematics depicting common tooling provided in the assembly line of FIG. 1 for forming the side cabin structure for each vehicle type being assembled on the assembly line.
Figure 5B:
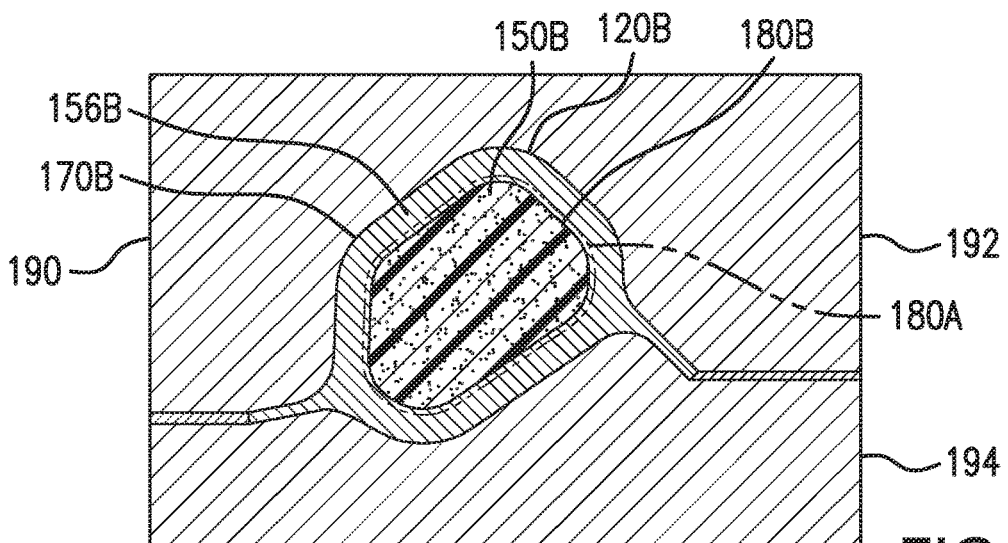
Figure 5C:
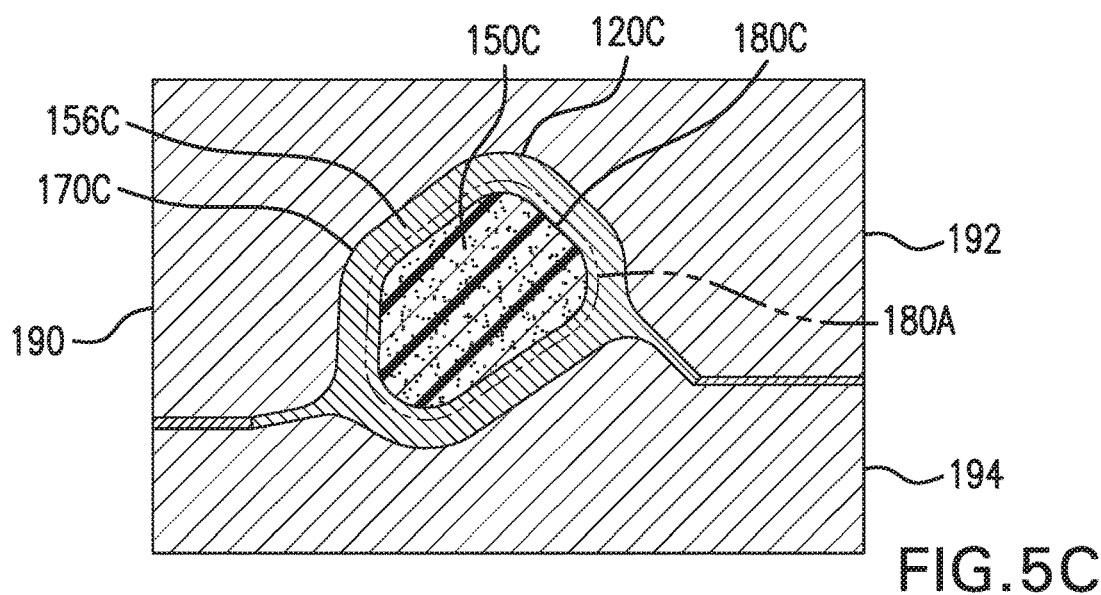

It should be appreciated that the preparation of the side cabin structure 120 can be carried out according to known methods. By way of example, FIGS. 5A, 5B, 5C illustrate that a common two-part mold 190 provided in the second assembly line 104 having upper and lower mold parts 192, 194 can be used to form each of the first, second and third side cabin structures 120A, 120B, 120C. With the use of the common mold 190, it is ensured that the first, second and third external geometries of the first, second and third side cabin structures 120A, 120B, 120C for the differing powertrain requirements are of the same shape and dimension (i.e., the first, second and third cross-section perimeters 170A, 170B, 170C are identical). This again allows the first, second and third side cabin structures 120A, 120B, 120C to be secured to a common vehicle frame, thereby allowing for differing vehicle types with differing powertrain requirements to be assembled on the same assembly line 100.

As is evident from the foregoing, the present disclosure is directed towards a method of assembling at least three types of vehicles with different powertrain requirements on the same assembly line 100. Each vehicle type comprises a composite side cabin structure 120 composed of a structural foam core 150 that is incased in a carbon fiber composite material 156. The size of the foam core and/or the number of layers 160 of composite material 156 is modified to accommodate the different powertrain requirements while maintaining the external geometry of the side cabin structure 120, thereby eliminating the need to change the vehicle layout when changing the structural properties. Because all external surface features of the side cabin structure 120 will remain the same regardless of the additional fiber reinforced material 156 that is added for the corresponding increase in body specification for the differing powertrain requirements, design layout will be common across all variants of the side cabin structure 120. Therefore, investment costs will be reduced because of assembly in the same assembly line 100 and common tooling can be used for the external surfaces.

It will be appreciated that variations of the above-disclosed features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of assembling at least two types of vehicles with different powertrain requirements on the same assembly line, the method comprising:

assembling a first structural body component for a first vehicle type including a first powertrain requirement on an assembly line, the first structural body component comprises a first structural core surrounded by a first fiber reinforced material, the first fiber reinforced material has a first thickness, and the first structural body component has a first external geometry; and assembling a second structural body component for a second vehicle type on the same assembly line that has a second powertrain requirement different from the first powertrain requirement, the second structural body component comprises a second structural core surrounded by a second fiber reinforced material, the second fiber reinforced material of the second body component has a second thickness that is different than the first thickness of the first fiber reinforced material of the first structural body component, and the second structural body component has a second external geometry, wherein the first external geometry is the same in shape and dimension as the second external geometry.

2. The method of claim 1, wherein the first powertrain requirement is an internal combustion engine, and the second powertrain requirement is one of plug-in hybrid electric, hybrid electric, and battery electric, and the second thickness of the second fiber reinforced material of the second body component is greater than the first thickness of the first fiber reinforced material of the first body component.

3. The method of claim 1, wherein the first powertrain requirement is plug-in hybrid electric, and the second powertrain requirement is battery electric, and the second thickness of the second fiber reinforced material of the second body component is greater than the first thickness of the first fiber reinforced material of the first body component.

4. The method of claim 1, wherein when the first thickness is greater than the second thickness, additional first fiber reinforced material for the first structural body component is offset inwardly toward a center of the first structural core, and
when the second thickness is greater than the first thickness, additional second fiber reinforced material for the second structural body component is offset inwardly toward a center of the second structural core.

5. The method of claim 1, wherein the first structural core has a first core external geometry and the second structural core has a second core external geometry, wherein the first core external geometry and the second core external geometry have the same shape but differing dimensions.

6. The method of claim 1, wherein the first structural body component is part of a side cabin structure for the first vehicle type and the second structural body component is part of a side cabin structure for the second vehicle type.

7. The method of claim 6, wherein the first structural body component is the entirety of the side cabin structure for the first vehicle type and the second structural body component is the entirety of the side cabin structure for the second vehicle type.

8. The method of claim 6, wherein the side cabin structure for each of the first structural body component and the second structural body component defines a first door opening and includes spaced first and second structural pillars interconnecting a roof side rail and a side sill.

9. The method of claim 8, wherein the side cabin structure for each of the first structural body component and the second structural body component defines a second door opening and includes a third structural pillar spaced from the second structural pillar and interconnecting the roof side rail and the side sill.

10. The method of claim 1, wherein the first external geometry and the second external geometry have the same cross-sectional shape and dimension.

11. A method of assembling at least two types of vehicles with different powertrain requirements on the same assembly line, the method comprising:
encasing a first structural core with a first fiber reinforced material having a first thickness to form a first structural side cabin structure for a first vehicle type being assembled on an assembly line, the first vehicle type includes a first powertrain requirement; and
encasing a second structural core with a second fiber reinforced material having a second thickness differing from the first thickness to form a second structural side cabin structure for a second vehicle type being assembled on the same assembly line, the second vehicle type includes a second powertrain requirement different from the first powertrain requirement,
wherein the second structural core has a cross-section perimeter differing in dimension from a cross-section perimeter of the first structural core so that a first external geometry of the first structural side cabin structure is the same in shape and dimension as a second external geometry of the second structural side cabin structure.

12. The method of claim 11, wherein the first powertrain requirement is an internal combustion engine, and the second powertrain requirement is one of plug-in hybrid electric, hybrid electric, and battery electric, and the second thickness of the second fiber reinforced material of the second structural side cabin structure is greater than the first thickness of the first fiber reinforced material of the first structural side cabin structure.

13. The method of claim 11, wherein the first powertrain requirement is plug-in hybrid electric, and the second powertrain requirement is battery electric, and the second thickness of the second fiber reinforced material of the second structural side cabin structure is greater than the first thickness of the first fiber reinforced material of the first structural side cabin structure.

14. The method of claim 11, wherein when the first thickness is greater than the second thickness, additional first fiber reinforced material for the first structural side cabin structure is offset inwardly toward a center of the first structural core, and
when the second thickness is greater than the first thickness, additional second fiber reinforced material for the second structural side cabin structure is offset inwardly toward a center of the second structural core.

15. The method of claim 11, wherein the first structural core has a first core external geometry and the second structural core has a second core external geometry that has the same shape as the first core external geometry.

16. A method of assembling at least three types of vehicles with different powertrain requirements on the same assembly line, the method comprising:
assembling a first structural body component for a first vehicle type including a first powertrain requirement on an assembly line, the first structural body component comprises a first structural core surrounded by a first fiber reinforced material, the first fiber reinforced material has a first thickness;
assembling a second structural body component for a second vehicle type on the same assembly line that has a second powertrain requirement different from the first powertrain requirement, the second structural body component comprises a second structural core surrounded by a second fiber reinforced material, the second fiber reinforced material of the second body component has a second thickness that is different than the first thickness of the first fiber reinforced material of the first structural body component; and
assembling a third structural body component for a third vehicle type on the same assembly line that has a third powertrain requirement different from the first and second powertrain requirements, the third structural body component comprises a third structural core surrounded by a third fiber reinforced material, the third fiber reinforced material of the third body component has a third thickness that is different than the first and second thicknesses of the respective first and second fiber reinforced materials of the first and second structural body components, wherein the first structural body component is part of a side cabin structure for the first vehicle type and has a first external geometry, the second structural body component is part of a side cabin structure for the second vehicle type and has a second external geometry, and the third structural body component is part of a side cabin structure for the third vehicle type and has a third external geometry, wherein the first external geometry, the second external geometry and the third external geometry are of the same cross-sectional shape and same dimension.

17. The method of claim 16, wherein the first powertrain requirement is an internal combustion engine, and the first thickness of the first fiber reinforced material of the first body component is less than each of the second thickness of the second fiber reinforced material of the second body component and the third thickness of the third fiber reinforced material of the third body component.

18. The method of claim 17, wherein the second powertrain requirement is plug-in hybrid electric, and the second thickness of the second fiber reinforced material of the second body component is less than the third thickness of the third fiber reinforced material of the third body component.

19. The method of claim 18, wherein the third powertrain requirement is battery electric, and the third thickness of the third fiber reinforced material of the third body component is greater than each of the first thickness of the first fiber reinforced material of the first body component and the second thickness of the second fiber reinforced material of the second body component.

20. The method of claim 16, wherein the first structural core has a first core external geometry, the second structural core has a second core external geometry, and the third structural core has a third core external geometry, wherein the first core external geometry, the second core external geometry and the third core external geometry have the same cross-sectional shape but differing dimensions.

* * * * *